Figure 1:
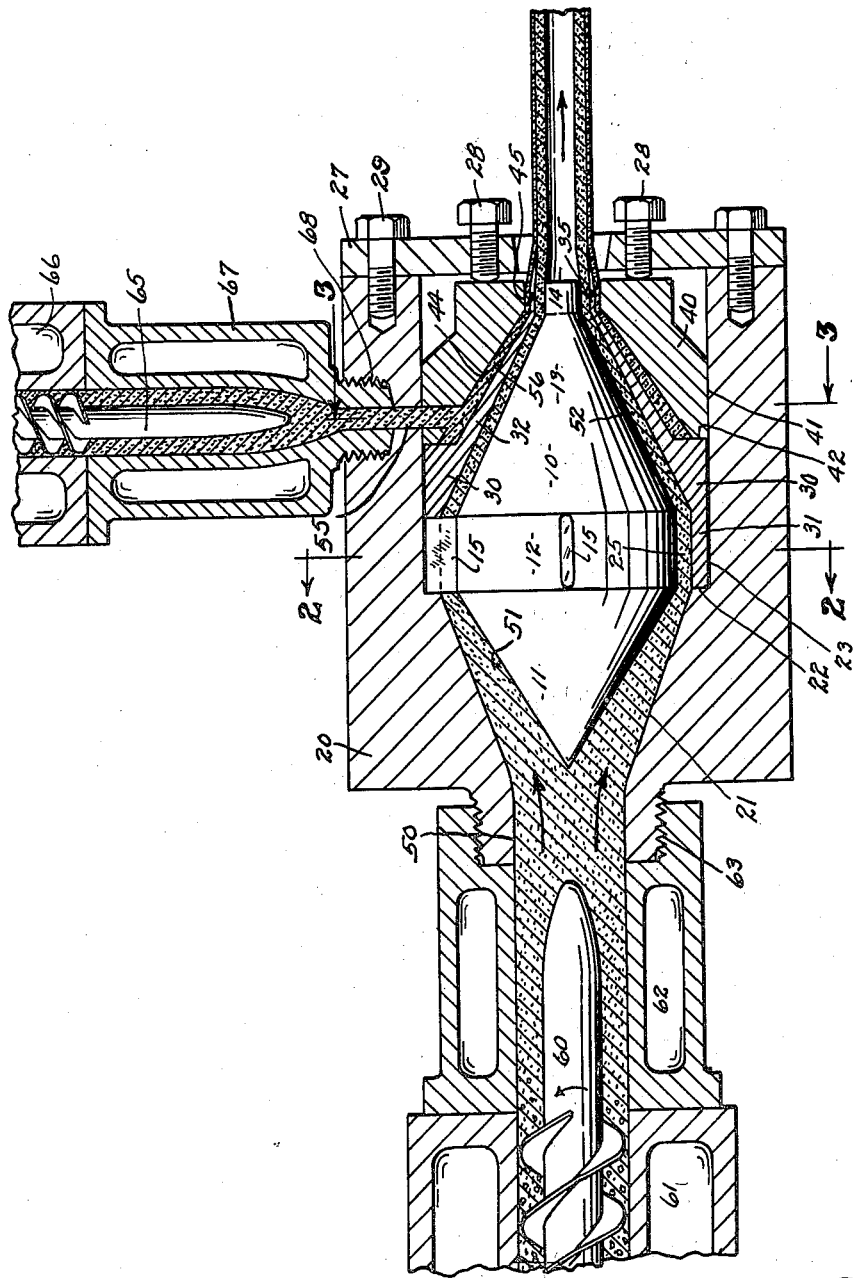

March 28, 1950

W. S. PRENDERGAST
METHOD AND APPARATUS FOR MAKING
MULTIPLE LAYER PLASTIC CONDUITS 2,501,690

Filed Dec. 9, 1947

2 Sheets-Sheet 1

Inventor
Walter S. Prendergast,
By Bates, Teare & McKee
Attorneys

March 28, 1950     W. S. PRENDERGAST     2,501,690
METHOD AND APPARATUS FOR MAKING
MULTIPLE LAYER PLASTIC CONDUITS Filed Dec. 9, 1947     2 Sheets-Sheet 2

Inventor
Walter S. Prendergast
By Bates, Teare & McBean
Attorneys

Patented Mar. 28, 1950

2,501,690

UNITED STATES PATENT OFFICE 2,501,690

METHOD AND APPARATUS FOR MAKING MULTIPLE LAYER PLASTIC CONDUITS

Walter S. Prendergast, Macedonia, Ohio, assignor to Carter Products Corporation, Cleveland, Ohio, a corporation of Ohio Application December 9, 1947, Serial No. 790,640

9 Claims. (Cl. 18—13)

This invention relates to the manufacture of conduits—garden hose, for instance—composed of two layers of plastic material. The invention is concerned with the method of manufacturing conduits and also with suitable apparatus which may be employed in carrying out such method.

Briefly, my method comprises forcing a quantity of plastic material in tubular form over a stationary mandrel and while the material is traveling, forming around it a second tubular layer of plastic material spaced from the first layer and traveling in the same direction, the two layers adhering to each other after passing beyond the mandrel. Preferably each layer is composed of suitable thermo-plastic material, the inner layer being usually selected for its resisting characteristics with reference to the substance to be transmitted through the conduit and the outer layer with particular reference to external abrasion.

A second feature of my method comprises expanding the inner tubular layer from its region of first formation to the region where it passes across the supports for the internal mandrel and then gradually contracting the expanded tube to seal the slits made by the supports.

The apparatus, which I prefer to employ in carrying out the method, comprises a pointed mandrel suitably supported within a tubular case spaced therefrom so that material fed against the point of the mandrel will be formed into a tubular condition and advanced along the exterior of the mandrel, and I provide within the case a second tubular passageway surrounding the first and adapted to be supplied with material from the exterior and discharging into the inner layer as it travels out of the case.

In my apparatus, I make the mandrel substantially in the form of two cones with their bases adjacent and with an intermediate substantially cylindrical region from which radial wings extend outwardly to support the mandrel. The first cone receiving the advancing material operates not only to form it into a tubular form but gradually enlarges such tube, reducing its thickness, so that the material is comparatively thin where it passes across the supporting wings. Then the material comes onto the second cone, the surface of which is approximately parallel with that of the surrounding casing, and thus such enlarged tube is gradually reduced in diameter as it travels, and is thereby circumferentially compacted. This seals the slits made by the passage across the supporting wings.

The apparatus is illustrated in the drawings hereof, which serve also to illustrate the method, and both the method and apparatus are hereinafter described in detail.

Figure 2:
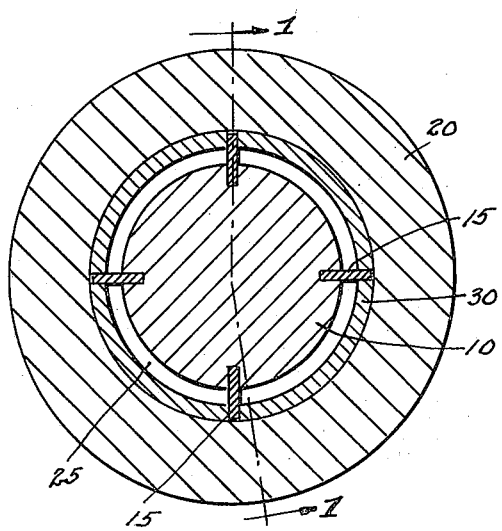
Figure 3:
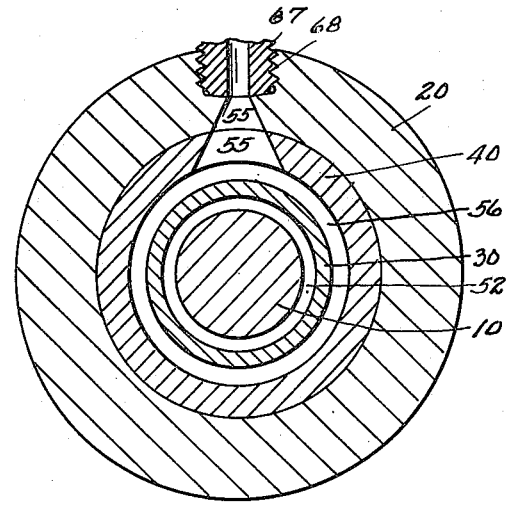
Figure 4:
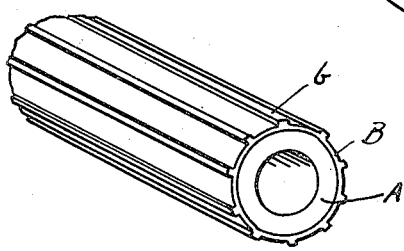

In the drawings, Fig. 1 is a longitudinal section through my apparatus, showing the material from one source being formed into an inner tubular layer about the mandrel and the material from another source formed into an outer tubular layer and discharged onto the inner layer, the section being taken on the two planes indicated by the line 1—1 on Fig. 2; Figs. 2 and 3 are cross sections through the mandrel respectively on the two planes indicated by the lines 2—2 and 3—3 on Fig. 1, the plastic material being omitted for clearness of illustration; Fig. 4 is a perspective of a portion of one form of hose or conduit which may be produced by my method and apparatus.

In the drawings, 10 indicates the mandrel, which is a solid member having a conical admission end portion 11, then a substantially cylindrical zone 12 and then a conical discharging portion 13 terminating in a small cylindrical extension 14. On the cylindrical portion 12 are radial wings 15, four being shown. These wings extend lengthwise of the cylindrical portion of the mandrel and are comparatively thin.

The casing for the mandrel comprises three members 20, 30 and 40. The member 20 is a solid block having a bore extending through it. This bore comprises an inwardly flaring conical wall 21 leading from the entrance end of the casing, the flare being at a less angle than that of the mandrel cone 11, so that the annular space between them is gradually reduced from the entrance to the inner end of this mandrel cone. At the inner end of the conical wall 21 is an outward offset 22 of the bore leading to a cylindrical bore 23 extending to the other end of the block 20.

The cylindrical bore 23 of the casing has an internal diameter substantially equal to the external diameter of the theoretic cylindrical envelope defining the exterior of the wings 15. Accordingly, when the mandrel is mounted in the casing the wings 15 bear at their outer edges on the wall of the bore 23 and at one of the radial edges against the offset 22, while there are arcuate spaces 25 between the mandrel and casing which, except for the wings, form a complete tubular annulus of cylindrical formation about the largest portion of the mandrel.

The mandrel is retained in position in the casing by the tubular member 30 which has a head portion 31 with a cylindrical exterior of a size corresponding to the cylindrical bore 23. This head portion carries a conical wall 32 which becomes gradually thinner to its innermost diameter where it has a thin cylindrical extension 35. This member 30 is mounted in the bore 23 with the far end of the head 30 abutting the wings 15 thereby holding the mandrel in place.

The member 30 is held in position in the bore 23 by the member 40 which is formed as shown with a cylindrical exterior 41 fitting the bore 23 and an annular end wall 42 adapted to abut the member 30. The inner surface of the member 40 is formed with a conical wall 44 of a greater angle than the outer surface of the member 32, this conical surface 44 terminating in a cylindrical surface 45 which is slightly greater in internal diameter than the surface 35.

Suitable means are employed to press the member 40 longitudinally into the casing block 20 against the head 30 forcing it against the wings 15 and the latter against the annular wall 22 of the block 20. The means shown for this purpose in Fig. 1 comprise a transverse plate 27 secured to the end of the block 20 by screws 29 and provided with screws 28 abutting the outer end of the member 40.

It will be understood from the above description that I have provided a comparatively large cylindrical passageway 50 in the block 20 (at the left hand end in Fig. 1) along which plastic material may be forced to travel about the mandrel through a gradually flaring but gradually restricted annular passageway 51 and thence across the wings of the mandrel through the passageways 25 and thence along the reducing conical passageway 52, giving a wall a substantially uniform thickness but circumferentially compacted until this inner layer material is discharged in the form of a continuous cylindrical tube.

By reason of the gradual expansion of the advancing mass of material, I am able to form it into a tube of desirable thickness, then by advancing this tube at its region of greatest expansion across the supports for the mandrel I enable the slits necessarily produced in passing those supports to be immaterial as they are automatically closed by the compaction of the material as its diameter is gradually reduced in passing into the form of a final tube.

While the described inner tube is being formed, an outer tube of plastic material is also formed in the space 56 between the conical former 32 and the member 40. An inwardly extending passageway 55 through the block 20 and member 40 communicates at its inner end with the conical space 56. The plastic material for the outer layer is forced through the passageway 55 into the gradually restricted conical annular passageway 56 and thus passes toward the right in Fig. 1 as the inner tube is traveling in that direction. This passageway 56 finally terminates in a thin annular passageway between the surfaces 45 and 35 and this produces a thin outer tube which engages the external surface of the inner tube as the two emerge from their respective passageways. There is thus produced a complete conduit comprising the inner tube and the surmounting outer tube adhering thereto.

It results from the formation of the passageways 50, 51 and 52 that the mass of hot material fed from the left in Fig. 1 becomes conical and gradually reduced in thickness as it travels toward the right, passes in comparatively thin cylindrical course across the wings, then becomes gradually reduced in diameter until it emerges from the apparatus as a cylindrical tube of plastic material. After the hot plastic material has passed across the thin wings 15 the slits made by those wings are immediately closed by the circumferential compaction of the material as it travels. This travel is at an accelerated rate as the diameter is gradually reduced until the material emerges as a small tube at the right hand end of the apparatus.

As the formed inner tube emerges from the apparatus the outer tube also emerges, traveling at the same rate and at once contracts into snug adherence to the exterior of the inner tube. The passageway 56 not only reduces the diameter of the outer layer being formed until it is only slightly larger than the inner layer, but may also reduce its thickness as shown. This is frequently preferable in making such a conduit or hose as illustrated in Fig. 4, where the inner layer A is of considerable thickness and provides the requisite strength and the outer enclosing layer B is a thin shell furnishing protection.

The material of the tubes may conveniently be different kinds of vinyl chloride or vinyl chloride polymerized with vinyl acetate for instance. Both these tubular members are preferably hot as they emerge from the die. On cooling, the external member contracts snugly into engagement with the inner member and thus produces such a hose as illustrated in Fig. 4, for instance, the hose being preferably artificially cooled, as for instance by spraying it with suitable apparatus not shown.

The outer tube may also provide a decorative effect by its color or external configuration; for instance, by forming it with longitudinal ribs made by grooves in the final forming wall 45, such ribs appearing in Fig. 4, where A indicates the inner tube, B the outer tube and b the ribs on the outer tube.

While any suitable means may be employed for forcing the hot plastic material to the respective entrance passageways 50 and 55, I have shown a conventional means for this purpose. Thus I have indicated in Fig. 1 a feed screw 60 in a steam jacketed casing 61 and 62 as the means for feeding the hot plastic material to the passageway 50. The casing 62 is shown as attached by an internal thread 63 to the block 20. Similarly for feeding the material to the passageway 55 I have indicated a feed screw 65 in a steam jacketed casing 66, 67, the latter secured by an externally threaded extension to the block 20 in registration with the passageway 55.

I claim:

1. A method of making a multiple layer plastic tube comprising forcing material into a tube form and gradually expanding the diameter of the tube and then gradually reducing it and while it is being reduced surrounding it by a second tubular layer advanced in the same direction as the first layer and eventually united thereto in a position encompassing said first layer.

2. An apparatus for making a conduit comprising a mandrel having two substantially conical portions with the bases of the cones adjacent, a casing surrounding the mandrel and spaced from it to leave a tubular passageway between them which first enlarges and then reduces in diameter, a second conical passageway in the casing surrounding the discharging portion of said tubular passageway and spaced from it, said second passageway terminating adjacent the discharge of the first passageway.

3. In an apparatus for making plastic tubes, the combination of a mandrel having a substantially pointed end and a conical portion with its apex at such end and its base at an intermediate region, the mandrel having a conical portion tapering in the opposite direction from such intermediate region, a casing occupied by the mandrel and having a conical wall spaced from the first-mentioned conical portion of the mandrel, a second member of the casing located within it and having a conical skirt surrounding and spaced from the second mentioned conical portion of the mandrel, and means for feeding material to the apex of the mandrel and to the exterior of said conical skirt.

4. In an apparatus for making plastic tubes with two layers, the combination of a mandrel having a pointed end and an enlarged intermediate region, and a gradually reduced conical portion extending from the intermediate region, a casing having a bore extending from one end to the other end, means for holding the mandrel within the casing and spaced from it, a hollow conical member within the bore surrounding the reduced conical portion of the mandrel and a third member of the casing surrounding a portion of the second member and spaced from it to leave a conical tubular passageway between them terminating at its inner end adjacent the discharge from the passageway between the first internal member and the mandrel.

5. In an apparatus for making plastic tubes, the combination of a mandrel having a substantially pointed end and a conical portion with its apex at such end and its base at an intermediate region, the mandrel having a cylindrical portion leading from the base of such conical portion and then a conical portion tapering in the opposite direction inwardly from said cylindrical portion, a casing having a bore occupied by the mandrel and spaced therefrom, the bore of the casing about the first-mentioned conical portion of the mandrel having less taper than such conical portion to leave a gradually reducing conical annular passageway between the casing and the first mentioned cone of the mandrel, a second member of the casing located within it and having a conical skirt surrounding and spaced from the second mentioned conical portion of the mandrel, and a third member in the casing surrounding said skirt and spaced from it to leave a conical passageway discharging adjacent the discharge of the conical passageway between the skirt and the mandrel, the mandrel and the casing terminating in spaced cylindrical portions to define the cylindrical formation of the tube produced, and means for feeding plastic material respectively to said apex and to the conical region between said second and third members.

6. The method of making a multiple layer conduit of plastic material comprising taking a solid mass of such material, forcing it against the apex of a conical mandrel to give such mass a tubular form and cause it to travel along the mandrel with a gradually increasing internal diameter and at the same time reducing the thickness of the conical plastic tube being formed, and then as the tubular member progresses reducing its diameter, while it is being reduced surrounding it by a second tubular layer advanced in the same direction as the first layer and eventually united thereto in a position encompassing said first layer.

7. In an apparatus for making plastic tubes, the combination of a mandrel gradually reduced in conical formation in each direction from an intermediate zone, a casing surrounding the mandrel and spaced from it to provide an annular passageway, and a support for the mandrel extending from said intermediate zone to the casing, said casing having a second annular conical passageway within it spaced from the first mentioned passageway and terminating at its small end adjacent the discharge end of the mandrel and a passage from the exterior to said second conical passageway.

8. In an apparatus for making plastic tubes, the combination of an open-ended casing, a round mandrel member within the casing gradually increasing in diameter from one end to an intermediate zone and then gradually reducing, means connecting said intermediate zone with the casing to support the mandrel while leaving a continuous passageway about the mandrel from one end to the other, a second member within the casing surrounding the reducing portion of the mandrel and spaced therefrom and a third member surrounding the second member and spaced therefrom and a passageway leading to the space between the second and third members.

9. In an apparatus for making plastic tubes, the combination of a mandrel having a pointed end and an enlarged intermediate region, outwardly extending wings on the intermediate region, a gradually reduced conical portion extending from the intermediate region, a casing having a bore extending from one end to the other end, the bore from one end being of conical form and at the other end being substantially cylindrical providing a shoulder where the cylindrical portion joins the conical portion, the wings of the mandrel extending into the cylindrical bore, a hollow member internally and externally conical and located within the cylindrical bore and surrounding the reduced conical portion of the mandrel, and a member in the casing internally conical and surrounding and spaced from said hollow member, and a passageway leading to the space between the two members last mentioned.

WALTER S. PRENDERGAST.

REFERENCES CITED

The following references are of record in the file of this patent:

UNITED STATES PATENTS

| Number | Name | Date |
|---|---|---|
| 253,822 | Mignon | Feb. 14, 1882 |
| 876,755 | Webb | Jan. 14, 1908 |
| 1,679,545 | Roth | Aug. 7, 1928 |
| 1,802,605 | Kemp | Apr. 28, 1931 |
| 1,978,163 | Megow | Oct. 23, 1934 |
| 2,401,551 | Cook, Jr. | June 4, 1946 |

FOREIGN PATENTS

| Number | Country | Date |
|---|---|---|
| 495,144 | Great Britain | Nov. 8, 1938 |
| 658,102 | Germany | Mar. 22, 1938 |